United States Patent [19]

Tibaldi

[11] Patent Number: 4,569,830

[45] Date of Patent: Feb. 11, 1986

[54] METHOD AND PLANT TO RECOVER CHROMIUM SALTS FROM TANNERY REFLUX WATER

[76] Inventor: Giovanni Tibaldi, Via Roma 4, Galliate (Novara), Italy

[21] Appl. No.: 558,502

[22] Filed: Dec. 6, 1983

[30] Foreign Application Priority Data

Dec. 30, 1982 [IT] Italy ................. 25067 A/82

[51] Int. Cl.$^4$ ............................................. C01G 37/00
[52] U.S. Cl. ....................................... 423/55; 75/109
[58] Field of Search .............. 75/109, 108; 423/55, 423/53; 210/724, 702, 709, 725, 726, 727, 728, 720

[56] References Cited

U.S. PATENT DOCUMENTS

| | | | |
|---|---|---|---|
| 4,108,596 | 8/1978 | Hemming et al. | 423/55 |
| 4,200,527 | 4/1980 | Cassella et al. | 210/724 |
| 4,338,200 | 7/1982 | Zeijlstra | 75/108 |
| 4,343,706 | 8/1982 | Etzel et al. | 210/724 |
| 4,401,573 | 8/1983 | Perrone et al. | 423/55 |

*Primary Examiner*—L. Dewayne Rutledge
*Assistant Examiner*—S. Kastler

*Attorney, Agent, or Firm*—Bucknam and Archer

[57] ABSTRACT

The present invention refers to a method to recover trivalent chromium salts from reflux water originating from a hide tanning process, via the so-called "chromium" system, including the following steps in succession:

flocculating all the trivalent chromium salts in the form of chromic hydroxide by treatment with an aqueous solution containing from 15 to 30%, by weight, of a salt made from a weak acid and a strong base, having a pH value lying between 6.9 and 7.2 and at a temperature lying betwen 22° and 26° C.;

separating chromic hydrate, obtained in this way, from the aqueous dispersion by concentration in a clarifier-flocculating device and successive filtration of the concentrate until a precipitate, is obtained preferably containing approximately 20% dry residue, by weight and dissolving precipitate, thus obtained in sulphuric acid, at a pH value lying between 1.8 and 2 and at a temperature higher than 50° C., preferably at 70° C.

The present invention also illustrates the plant for carrying out this method.

3 Claims, 1 Drawing Figure

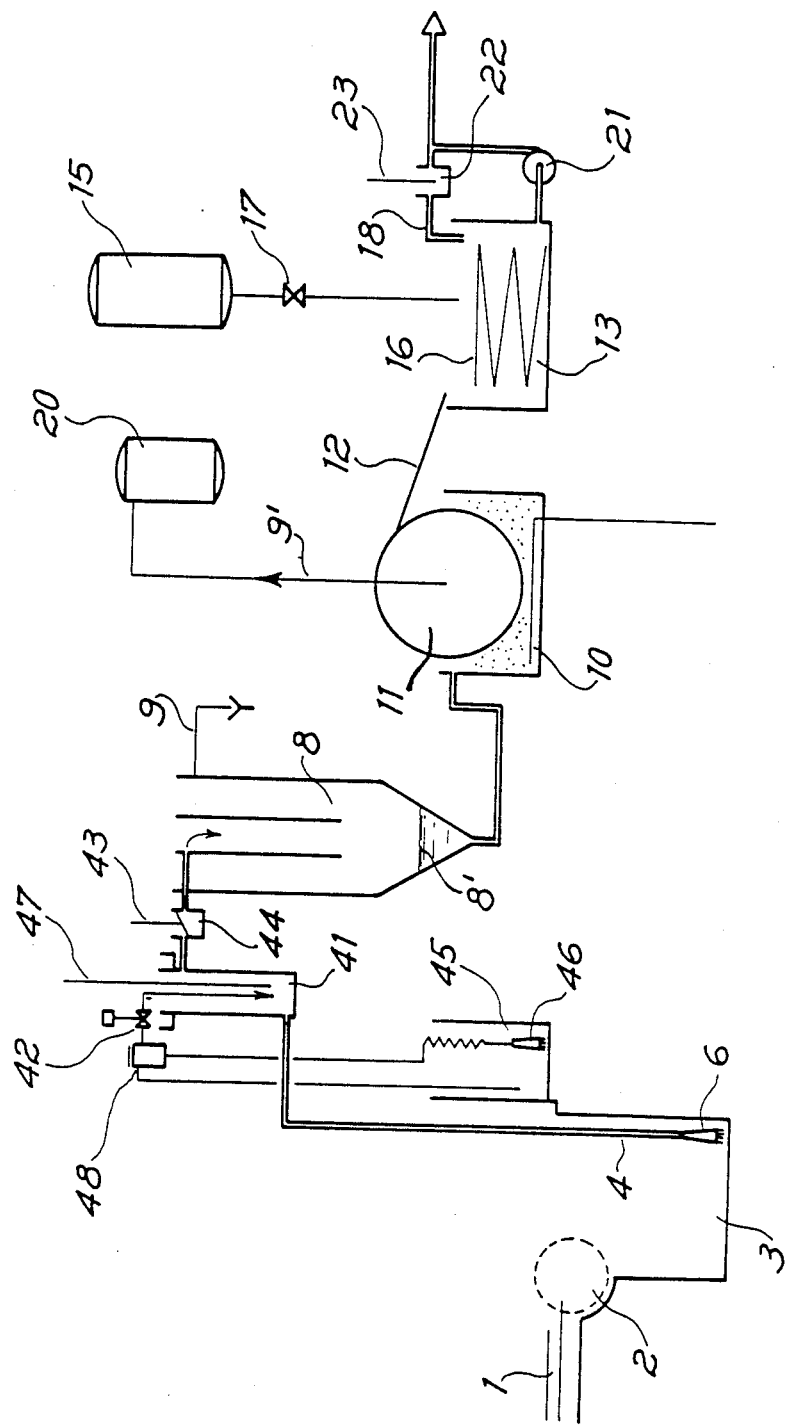

METHOD AND PLANT TO RECOVER CHROMIUM SALTS FROM TANNERY REFLUX WATER

The present invention relates to a method for the recovery of trivalent chromium salts from the reflux water originating from a hide tanning process, using the so-called "chromium" system. The present invention also relates to a continuous and automatic plant for carrying out this method. As is known the water originating from a hide tanning process using the so-called "chromium" system is essentially a dilute solution of trivalent chromium salts. These salts, if dispersed in the sewers, represent a highly polluting agent, whereas, if they are recovered, they constitute a substantial economical advantage, considering the high cost of chromium based products.

Various processes have been proposed to recover these chromium salts from the water originating from a tanning process, but none of them has made it possible to achieve satisfactory results.

One of these known processes consists of precipitating the trivalent chromium in tanks, via flocculation at a pH 7-8 using sodium hydroxide and after decantation, separation of the precipitate from the water in a filter press.

The panels of chromium hydrate obtained in this way are subsequently treated with a sulphuric acid solution to dissolve them.

This process consists of a series of steps, which require considerable time to be effected and, in addition, the plant to realise this process requires considerable operating and maintenance labour.

Furthermore, the decantation process of the flocculant, alone, does not make it possible to obtain dispersions having a titre greater than 6-8% chromium; hence, the endevour to shorten the cycle by effecting the treatment with sulphuric acid directly on the concentrate has not given satisfactory results, both because the process is not readily controllable and because a poorly purified product to be recycled is obtained.

A continuous recovery procedure is also known, in which the chromium salts are precipitated as chromic hydrate by the addition of sodium hydrate, at pH 7-8 and coagulation is performed at 50°-70° C. to increase the coagulation rate.

Subsequently, separation of the precipitate is performed continuously on a rotary filter, after having possibly concentrated the solutions containing less than 1% trivalent chromium. The chromic hydrate pannel obtained in this way is dissolved by treatment with a 98% sulphuric acid solution, at an uncontrolled temperature. This is the technologically most advanced procedure and makes it possible to obtain a considerable labour saving, however, it still presents several drawbacks.

In fact, the high alkalinity of the sodium hydrate may lead to a partial redissolution of the chromium, especially if the pH is not absolutely uniform throughout the solution. Furthermore, the relatively high temperature of the water during the process causes an increase in the solubility of the chromium hydrate and may also prevent the discharge water from being re-used directly for a new pickling therefore, requiring suitable cooling.

The object of the present invention is to provide a recovery method of the chromium salts from the water originating from a "chromium" tanning process, which does not have the above described drawbacks.

More specifically, the object of the present invention is to provide a recovery method for the chromium salts from the water originating from a "chromium" tanning process, which makes it possible to obtain complete re-use, even of the very dilute reflux water, formation of a filtrate mainly consisting of purified chromic hydrate and readily soluble in sulphuric acid and filtered water suitable for direct use in new pickling.

A further object of the present invention is to provide a recovery method for chromium salts from reflux water originating from a "chromium" tanning process, which may be realised in a continuous and completely automatic plant, with a low labour requirement, both for its operation and for maintenance.

The applicant has now found that these and other objects are achieved by a method which consists of the following steps:

flocculating all the trivalent chromium salts contained in the reflux water originating from a "chromium" tanning process, in the form of chromic hydroxide by treatment with an aqueous solution containing a salt from 15 to 30%, by weight, formed by a weak acid and a strong base, at a pH value lying between 6.9 and 7.2 and at a temperature lying between 22° and 26° C.;

separating the chromic hydrate, obtained in this way, from the aqueous dispersion by concentrating in a clarifier-flocculating device followed by filtration of the concentrate until a precipitate is obtained containing preferably approximately 20% dry residue, by weight; and dissolving the precipitate obtained in this way in sulphuric acid, at a pH value lying between 1.8 and 2 and at a temperature greater than 50° C., preferably at 70° C.

One of the essential characteristics of the method, subject of the present invention is that flocculation of the chromium salts is effected with an aqueous solution of a salt formed by a weak acid with a strong base, such as, for example, a carbonate of an alkaline metal.

In fact, this treatment not only allows complete transformation of the chromic ions into chromic hydrate, even in very dilute solutions, for example, less than 1% by weight, but also causes micro-mixing during the treatment of the precipitate with sulphuric acid caused by the development of carbon dioxide due to the action of the sulphuric acid on the carbonates present in the sodium hydrate of the precipitate.

Any salt formed by a weak acid and a strong base can be used to flocculate the trivalent chromium salts. In practice, an alkaline metal carbonate is preferred and in particular sodium carbonate.

The plant to realise the process, also subject of the present invention, includes a container into which the reflux water coming from a "chromium" tanning process and the aqueous solution of the salt made from a weak acid and a strong base is transferred.

It is preferred to feed the aqueous solution of the salt counter-currently with respect to the reflux water flow to permit complete mixing. The reaction water, containing the chromic hydrate in a flocculated forms, is fed to a clarifier-flocculating device which makes it possible to obtain precipitation of the chromic hydrate in the terminal cone up to a content of 2-6% chromium and a stripping of salt water (usually 6 Bé for sodium chloride) at a suitable temperature for immediate transfer to the pickling operations.

The concentrate is transferred to a rotating filter with a filtering fabric of suitable permeability, for example 25-35 $l/dm^3$ of air per minute, at a pressure of 2 $Kg/cm^2$. The filter withholds the precipitate including a certain quantity of carbonate, and, in the conditions described above, is able to dissipate approximately 0.1-0.3 $m^3/m^2$ h of turbid liquid.

The precipitate layer, containing approximately 20% dry residue, withheld on the filter, is continuously removed by a scraper blade and is constantly dishcarged into a reactor equipped with a mixer, steam heater coil which assures the temperature of 70° C. and a pH-meter. The pH-meter operates a solenoid valve which controls the introduction of sulphuric acid at 98% to maintain the solution at a pH value from 1.8 to 2.

BRIEF DESCRIPTION OF THE DRAWING

For a better understanding, the present invention will now be described by referring to the FIGURE of the attached drawing which represents a schematic, illustrative but non-limitative illustration of the plant, suitable to put the method subject of the present invention into practice.

With reference to the FIGURE, the treatment and wash water of a tannery is transferred to the tank 3, generally made of cement by a pipe 1 after separation of the dissolved parts by a filter 2.

It is preferable for the tank 3 to have sufficient capacity to contain at least two days processing, to make the solution to be treated have as homogeneous a concentration as possible.

The filtered reflux solution is sucked by a self-priming, or immersed pump 6 and forced, through the pipe 4, to the bottom of a tank 41. A container 45 supplies a sodium carbonate solution from the top of the tank 41, hence the solution containing the trivalent chromium flows in counter-current to the sodium carbonate solution.

The quantity of sodium carbonate solution supplied is metered by a solenoid valve 42 controlled in turn by a pH-meter 43 fitted in a small tank 44, arranged at the side of the tank 41.

The tank 44 has a sloping surface, in order to increase the flow rate of the solution and prevent possible accumulation of chromium hydroxide on the bulb of the pH-meter probe 43. In addition, a submerged pump 46 is immersed to completely avoid possible crystallisation of the sodium carbonate and to maintain a well controlled flow into the tank 45, containing the sodium carbonate solution, which continuously transfers the solution under pressure so as to obtain a constant water head, determined by the over flow 48.

In this way, homogenisation of the solution, which is always present, is achieved with a constant water head up-stream of the metering solenoid valve 42.

The solution temperature is controlled with the introduction of steam from the pipe 42 to assure complete and continuous reaction between the chromic salts contained in the reflux water and the sodium carbonate.

Finally, to avoid possible formation of foam due to the reaction and to heating a maintenance area 49 is foreseen which favours the discharge of the foam into the tank 3. The sodium carbonate solution, metered by the solenoid valve 42 in accordance with the control set by the pH-meter 43, causes the trivalent chromium to precipitate in flakes, maintaining the solution buffered between pH 6.9-7.2 with a buffer solution made up of sodium carbonate at 15-20%, by weight.

The solution which has reacted and remains buffered is transferred to the clarifier-flocculating device 8, fitted with a concentrating conic bottom 8' and a breather 9 in the upper part, from which the clear salt solution flows freed of the flocculate. The clear salt solution is conveyed into the tank 20 containing the pickling solution. The concentrate at the base of the clarifier-flocculating device cone 8' is made to flow onto the outside of a rotating filter in depression 11, operating under a vacuum of 600-700 mm. mercury and equipped with polypropylene flitering material having an air permeability of 25-35 $l/dm^2$ per minute, at the pressure of 2 $Kg/cm^2$. To achieve homogeneous filtration treatment, continuous mixing is maintained in the filter tank 11 using low pressure compressed air by means of a diffusor distributor 10 to avoid sedimentation of the hydroxide on the bottom. The solid concentrated on the filter mesh 11 is removed by a scraper blade 12 together with blowing of compressed air, while the salt solution is transferred to the tank 20 via the pipe 9' from which it may be withdrawn for a new pickling cycle.

The solid material, which contains approximately 20% dry matter and maintains a discrete quantity of sodium carbonate in 80% solution is caused to fall into a collector tank 13 and heated to 70° using a steam coil 16.

To improve and overcome solution of the chromium hydroxide a forced recycle using a pump 21 made of acid-proof material is foreseen in the collector tank 13, which is suitably heated and thermostatically controlled at a temperature of 70° C., the said pump sucks the fluid from the tank bottom 13 returning it to the upper edge and causing it to partially drop into 18.

A small tank 22 is installed in the upper section of the recycle circuit fitted with a pH-meter indicator controller 23 and a vent device 18 which communicates with the collector tank 13.

The sulphuric acid is fed into the tank 13, from the tank 15 via a solenoid valve 17 in a sufficient quantity to neutralise the chromium hydroxide at 70° C. and to adjust the pH value to 1.8-2.

The solution at pH 1.8-2 is transferred to the tank 20, following possible filtration and is ready to be titred at the desired chromium titre and therefore to be returned to the tanning cycle for the hides that have already been subject to pickling.

From the above it is clear that the method subject of the present invention makes it possible to achieve the maximum re-use of the chromium and also of the salt solutions ready to be returned to the hide tanning cycle, with a high processing rate, in the almost total absence of manual interventions and with only technical supervision of the conveying and conditioning equipment.

Variations, alterations and changes may be made to the method and to the relative plant described above following the indications of the present invention without by so doing leaving its protective sphere.

I claim:

1. A method to recover chromium salts from the water originating from a hide tanning process, being recycled comprising the steps of:
    (1) flocculating all the trivalent chromium salts in the form of chromic hydroxide by treatment with an aqueous solution containing from 15 to 30% by weight of a salt formed from a weak acid and a strong base, having pH between 6.9 and 7.2 and at a temperature lying between 22° and 26° C. to obtain chromic hydroxide;

(2) separating the chromic hydroxide, thus obtained, from the aqueous dispersion by concentration in a clarifier-flocculating device followed by filtration of the concentrate by means of a filter having a permeability of 25–35 $l/dm^3$ of air per minute, at a pressure of 2 $Kg/cm^2$, until a precipitate containing about 20% dry residue, by weight, is obtained, and (3) dissolving the precipitate from step (2) in sulfuric acid, at a pH between 1.8 and 2 at a temperature between 50° C. and 70° C.

2. The method, according to claim 1, wherein the salt formed from a weak acid and a strong base in step (1), is a carbonate of an alkali metal.

3. The method, according to claim 2, wherein the salt is sodium carbonate.

* * * * *